United States Patent [19]

Funada et al.

[11] 4,443,065
[45] Apr. 17, 1984

[54] INTERFERENCE COLOR COMPENSATION DOUBLE LAYERED TWISTED NEMATIC DISPLAY

[75] Inventors: Fumiaki Funada, Yamatokoriyama; Masataka Matsuura, Tenri; Tomio Wada, Nara, all of Japan

[73] Assignee: Sharp Kabushiki Kaisha, Osaka, Japan

[21] Appl. No.: 327,229

[22] Filed: Dec. 3, 1981

[30] Foreign Application Priority Data

Dec. 9, 1980 [JP] Japan .................................. 55-174406
Jan. 30, 1981 [JP] Japan .................................. 56-13234

[51] Int. Cl.³ ...................... G02F 1/133; G02F 1/137
[52] U.S. Cl. .................. 350/335; 350/347 E; 350/347 R
[58] Field of Search ............... 350/335, 348, 347 E, 350/347 V, 347 R

[56] References Cited

U.S. PATENT DOCUMENTS

| | | | |
|---|---|---|---|
| 4,099,855 | 7/1978 | Wisbey et al. | 350/335 X |
| 4,231,639 | 11/1980 | Banda | 350/335 |
| 4,375,317 | 3/1983 | Funada | 350/335 |

OTHER PUBLICATIONS

Aviram et al., "Multicolor Display", IBM Technical Disclosure, vol. 15, No. 8, Jan. 1973.
Bleha et al., "9.1: The Use of the Hybrid Field Effect Mode Liquid Crystal Light Value with Visible Spectrum Projected Light", Conference 1977, SID International Symposium (Digest of Technical Papers), Boston, Mass. (Apr. 19–21, 1977).
Meyerhofer, "Optical Transmission of Liquid-Crystal Field-Effect Cells", Journal of Applied Physics, vol. 48, No. 3, American Institute of Physics, Mar. 1977.

*Primary Examiner*—John K. Corbin
*Assistant Examiner*—David Lewis
*Attorney, Agent, or Firm*—Birch, Stewart, Kolasch & Birch

[57] ABSTRACT

A double-layered twisted nematic liquid crystal display device which comprises a double layered structure including first and second layers of liquid crystal, the molecules of said liquid crystal having their longitudinal axes which are twisted, the direction of twist in the first layer being different from that in the second layer and wherein the longitudinal axes of the liquid crystal molecules in each of the first and second layers are perpendicular to each other, an electrical power supply means for applying a voltage to one of the first and second layers for controlling the orientation of the molecules of the liquid crystal in the first layer, the other of said first and second layers serving as a compensator which compensates for interference coloring, and a polarizing means for visibly enhancing the orientation of the molecules of the liquid crystal in the first layer when the voltage is applied thereto.

4 Claims, 10 Drawing Figures

INTERFERENCE COLOR COMPENSATION DOUBLE LAYERED TWISTED NEMATIC DISPLAY

The present invention generally relates to a twisted nematic liquid crystal display device of field effect type utilizing a twisted nematic liquid crystal wherein the longitudinal axes of the liquid crystal molecules are twisted substantially 90° between a pair of substrates with the helical axis extending perpendicular to the substrates. The present invention pertains to a technique for minimizing the coloring phenomenon which tends to occur in the specified liquid crystal display device during the deenergization.

The recent trend in the field of a liquid crystal display is that, in view of the increasing demand to expand the information display capacity, a matrix type display is superseding a segment type display. However, in order for the matrix type display to be able to display a relatively large volume of information, it is necessary to increase the duty ratio of multiplex addressing with the consequent reduction in display contrast and also in angle of view. As a means for eliminating these problems, it has been suggested to reduce both the thickness d of the liquid crystal used and the birefringence $\Delta n (= n_e - n_o$, wherein $n_e$ is the refractive index to extraordinary light and $n_o$ is the refractive index to ordinary light). See, D. Meyerhofer: J. Appl. Phys. 48 1179(1977).

However, when the layer thickness d and the birefringence $\Delta n$ are reduced in the twisted nematic liquid crystal display device of field effect type, the mode of propagation of light through the liquid crystal represents an elliptically polarized light rather than a linearly polarized light and, therefore, when combined with the polarized light, the liquid crystal display device is susceptible to the interference coloring. This interference coloring is generally referred to as Mauguin effect and tends to be enhanced when $d \cdot \Delta n \simeq 2$ $\mu$m. This phenomenon is responsible for the occurrence of the coloring of inoperative elements of the display area which would result in reduction in contrast relative to operative elements of the same display area. This is undesirable in view of the fact that the quality of the display device is reduced.

FIG. 1 of the accompanying drawings illustrate, in schematic sectional view, the prior art twisted nematic liquid crystal display device of field effect type. This device includes a pair of transparent substrates 1a and 1b sealed together in spaced relation to each other by means of a sealing material 5 which also serves as a spacer, a pair of transparent electrodes 2a and 2b, a pair of liquid crystal molecule orientation layers 3a and 3b, a layer of twisted nematic liquid crystal 4 and a pair of polarizing filters 6a and 6b, the transparent electrodes 2a and 2b being electrically connected to a drive circuit 7. In this construction shown in FIG. 1, in order to render the prior art display device to be suited for multiplex addressing, the product of the thickness d of the liquid crystal layer 4 and the birefringence $\Delta n$ of the liquid crystal, forming the layer 4, within the visible wavelength region, that is, $d \cdot \Delta n$, should be selected to be of a small value, for example, 0.36 $\mu$m $\leq d \cdot \Delta n \simeq 2.0$ $\mu$m, as has been experimentally demonstrated. The lowermost limit corresponds to the minimum value of the product $d \cdot \Delta n$ of the twisted nematic liquid crystal layer at which the linearly polarized light of a visible wavelength is rotated 90°. The details thereof are discussed in J. Phys. D: Appl. Phys. 8 1575 (1975), by C. H. Gooch and H. A. Tarry.

However, it has been found that, when the product $d \cdot \Delta n$ is larger than 2 $\mu$m, the light passing through the liquid crystal layer tends to become an elliptically polarized light because of the rotary dispersion and, when a pair of polarized light elements are allowed to pass, an effect can be presented to give an interference coloring.

The present invention aims at substantially eliminating the above described problems by the utilization of a technical means and is intended to provide a novel and useful multi-layered liquid crystal display device wherein, in order to drastically reduce the coloring phenomenon of the inoperative portions which would result from the interference coloring with respect to a liquid crystal cell suited for multiplex addressing and having a relatively small value of $d \cdot \Delta n$, a twisted nematic liquid crystal layer with no electrical power supply means is superimposed on the conventional single-layered twisted nematic liquid crystal display device of field-effect type, that is, wherein in order to obtain such effects as exhibited by an optical compensator used in combination with the conventional single-layered cell for reducing the coloring phenomenon, a twisted nematic liquid crystal layer is arranged in place of the optical compensator.

This and other objects and features of the present invention will become apparent from the following description taken in conjunction with preferred embodiments thereof with reference to the accompanying drawings, in which.

Before the description of the present invention proceeds, it is to be noted that like parts are designated by like reference numerals throughout the accompanying drawings.

Figure 1:
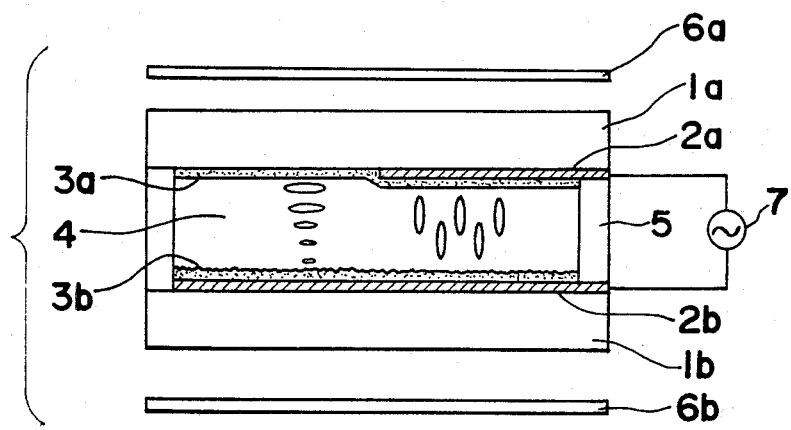
FIG. 1 is a schematic side sectional view of the prior art twisted nematic liquid crystal display device of field-effect type.

Referring first to FIG. 1, a double-layered liquid crystal display device embodying the present invention comprises a plurality of transparent substrates 1a, 1b and 1c, a pair of transparent electrodes 2a and 2b, a plurality of liquid crystal molecule orientation layers 3a, 3b, 3c and 3d, a pair of twisted nematic liquid crystal layers 4a and 4b, a sealing material 5 used to seal the transparent substrates 1a, 1b and 1c together in spaced relation to each other, which sealing material 5 concurrently serves as a spacer, and a pair of polarizing filters 6a and 6b. Reference numeral 8 represents a reflector plate which may or may not be used.

Figure 2:
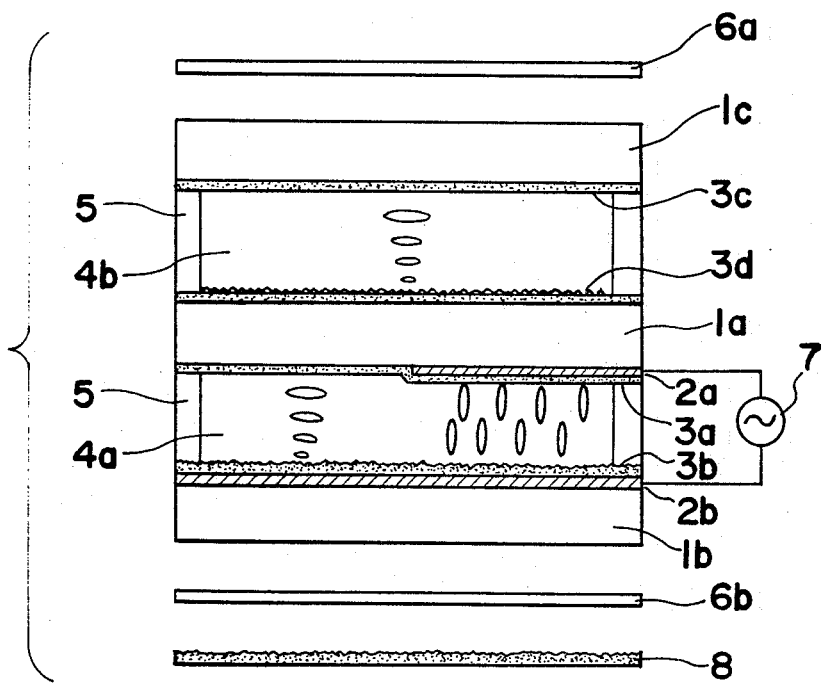
FIG. 2 is a schematic side sectional view of a double-layered liquid crystal display device according to one preferred embodiment of the present invention.
Figure 3:
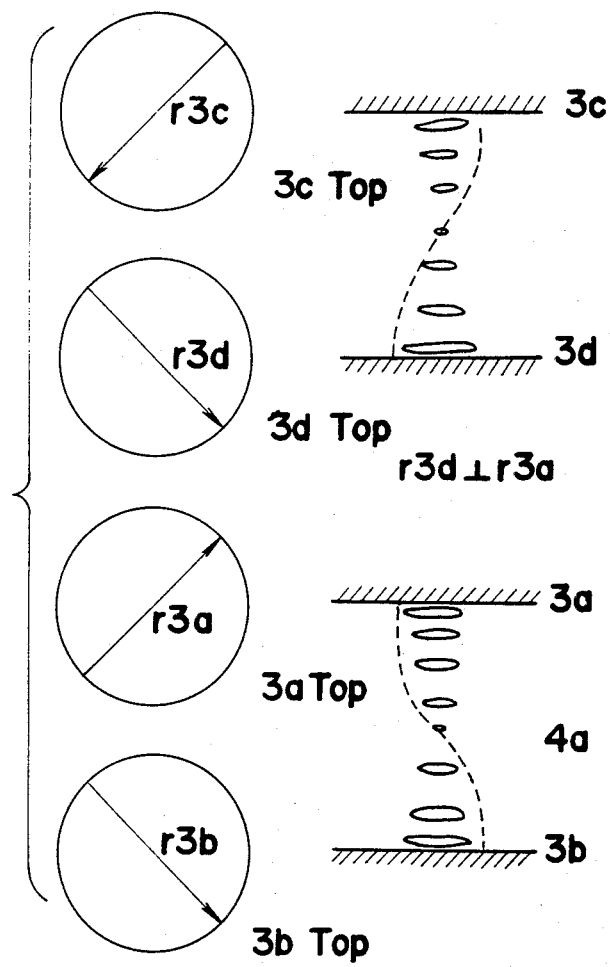
FIG. 3 is a diagram used to explain the orientation of the longitudinal axes of the liquid crystal molecules on each of substrates in the embodiment shown in FIG. 2.
Figure 4:
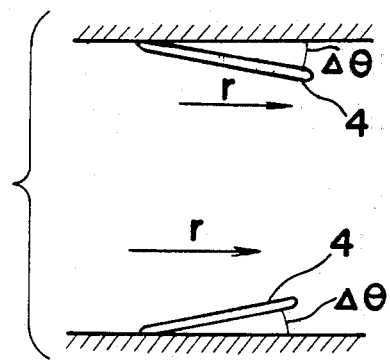
FIG. 4 is an explanatory diagram used to define the longitudinal axis of the liquid crystal molecule having a tilt angle of $\theta$.

FIG. 3 illustrates a diagram used to explain the orientation γ (hereinafter referred to as a director) of the longitudinal axis of the liquid crystal molecule on the surface of each of the transparent substrates in the embodiment of FIG. 2. The arrow-headed directions shown in FIG. 3 are defined as a direction of the longitudinal axis of the liquid crystal molecule having a tilt angle of $\Delta\theta$ relative to the substrates as shown in FIG. 4.

Hereinafter, materials and their quality of the component parts used in the embodiment of FIG. 2 will be discussed.

Each of the transparent substrates 1a, 1b and 1c is made of soda-lime glass having a thickness within the range of 0.1 to 2 mm. Each of the transparent electrodes 2a and 2b is made of $In_2O_3$ (with $SnO_2$ added), 300 to 4,000 Å in thickness, and is formed on the corresponding transparent substrate in a predetermined pattern by the use of a photolithographic technique or any other known technique. Each of the liquid crystal molecule orientation layers 3a to 3d can be formed either by the slant-evaporation of SiO or by rubbing an insulating layer overlaying a layer of $SiO_2$ or polyimide by the use of a polishing cloth directly or after having been treated with a silane coupling agent.

A material for each of the twisted nematic liquid crystal layers 4a and 4b is selected from materials having a nematic liquid crystal phase, such as biphenyl type, ester type, cyclohexane type and azoxy type, and is mixed with a small quantity of an optically active substance for the purpose of fixing the direction of twist and thereby avoiding any possible twist disorientation. Specifically, about 0.1 wt% of a material identified by the trademark CB-15 manufactured and sold by BDH may be added in the case where the rightward direction of twist is desired to be imparted to ZLI-1646, which is a trademark for a liquid crystal manufactured and sold by Merck, and defined as a cyclohexane liquid crystal. In the case where the leftward direction of twist is desired to be imparted to the same ZLI-1646 liquid crystal, about 0.1 wt% of a moisture identified by the trademark Cholesterilnonanoate, manufactured and sold by Eastman Kodak may be added. The birefringence $\Delta n$ of the liquid crystal so mixed with the optically active substance is 0.08 at 20° C. relative to light of a wavelength of 598 nm irrespective of the direction of twist.

The thickness d of each of the liquid crystal layers 4a and 4b is selected to be within the range of 3 to 10 μm, and 6.2 μm has been chosen for the purpose of the embodiment of the present invention. It is to be noted that the thicknesses d of the respective liquid crystal layers 4a and 4b are preferred to be substantially equal to each other or to be of a value falling within the tolerance of 30% relative to the difference therebetween where the birefringences $\Delta n$ of the respective liquid crystals forming the layers 4a and 4b remain the same. However, where the birefringence $\Delta n$ of the liquid crystal forming one of the layers 4a or 4b differs from that of the other of the layers 4b or 4a, the relative values of d·$\Delta n$ of these layers are preferred to be equal to each other, but may fall within the tolerance of 30% relative to the difference of these values d·$\Delta n$ of the respective layers. In any event, the value d·$\Delta n$ is selected to be within the range of 0.4 to 0.6 μm, 0.8 to 1.2 μm or 1.5 to 1.8 μm.

With respect to the orientation of the liquid crystal molecule, it is preferred that the liquid crystal molecule orientations of the respective liquid crystal layers 4a and 4b on respective sides of the intermediate transparent substrate 1a are perpendicular to each other. The molecule orientation is so selected that the directions of twist of the respective liquid crystal layers 4a and 4b are opposite to each other. Specifically, where the liquid crystal layer 4a is helically twisted rightwards, the liquid crystal layer 4b should be helically twisted leftwards.

The sealing material which also serves as a spacer is preferably employed in the form of an epoxy resin mixed with glass fibers having a diameter within the range of 3 to 10 μm. Each of the polarizing filters is preferably employed a film of iodines, dyestuffs or polyenes and the product, identified by L-82-18, manufactured and sold by Sanritsu Denki is most suited as the polarizing filters used in the present invention. With respect to the reflector plate, any one of sandblasted aluminum plate or an acrylic plate having at least one surface roughened or ground and then vapor-deposited with aluminum.

Figure 5:
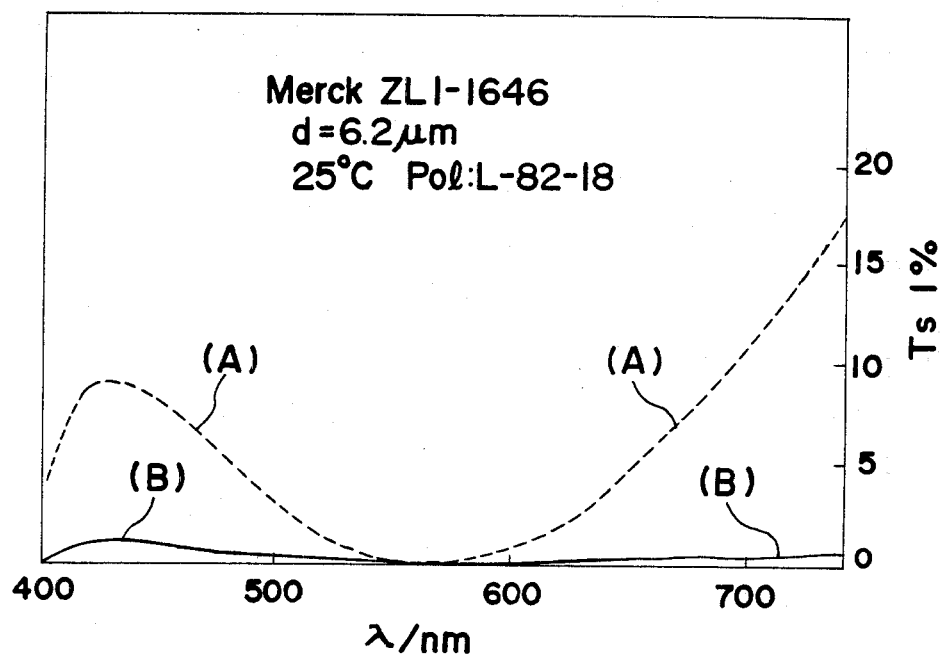
FIG. 5 is a diagram showing the spectrum used to explain the effect of the embodiment shown in FIG. 2.

FIG. 5 is a graph of the spectrum showing the effect of the present embodiment, wherein the axes of abscissas and ordinates represent the wavelength of light and the intensity of transmitted light, respectively. In the graph shown in FIG. 5, a curve (A) is exhibited by the single-layered twisted nematic liquid crystal display device of field effect type which is of a construction shown in FIG. 1 and wherein the polarizing directions of the polarizing filters used therein were made to be parallel to each other. A curve (B) is exhibited by the double-layered liquid crystal display device shown in FIG. 2 wherein the polarizing directions of the polarizing filters used therein are made to be perpendicular to each other. In the spectrum shown in FIG. 5, the most preferred curve is such that the value of Ts is zero at all wavelength and, in this case, no interferences coloring appear. Considering this, it will readily be seen that the curve (B) exhibited by the device of the present invention approximates to the most preferred curve and that the device of the present invention is, therefore, substantially free from the interference coloring which tends to often occur in the prior art device.

Thus, by the utilization of the present invention, no interference coloring substantially occur even in the twisted nematic liquid crystal display device of field effect type suited for multiplex addressing wherein the value of d·$\Delta n$ is smaller than 2.0 μm and, therefore, the display device of high quality can be obtained.

Figure 6:
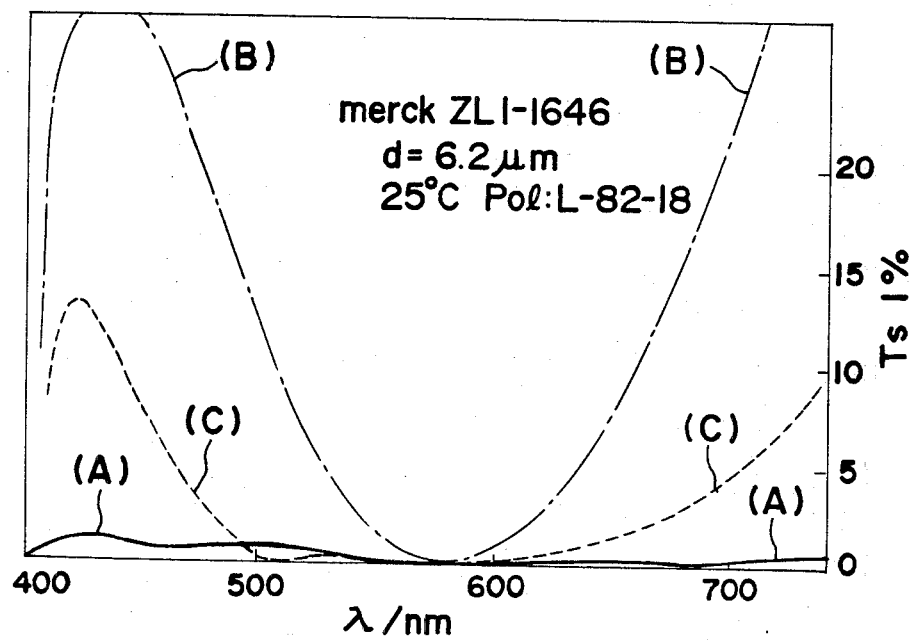
FIG. 6 is an explanatory diagram showing the spectrum which varies with the orientation of the liquid crystal molecule.
Figure 7:
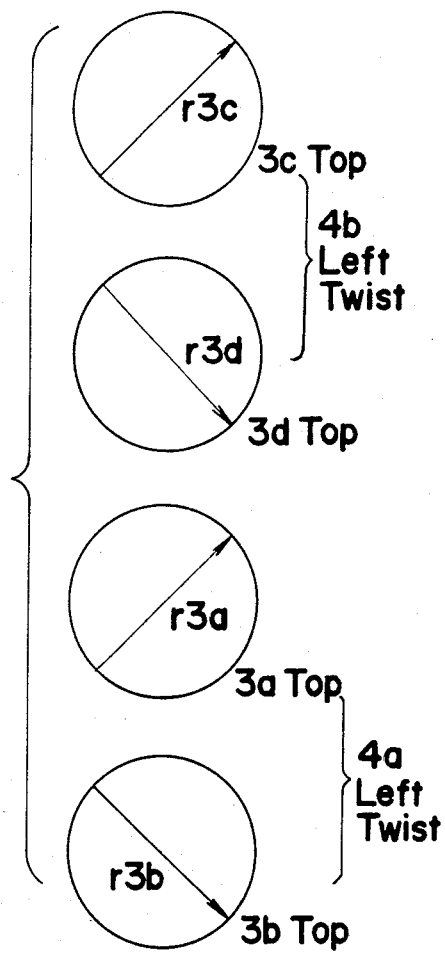
FIGS. 7 and 8 are explanatory diagrams showing the orientation of the liquid crystal molecule corresponding to the spectrum shown in FIG. 6.
Figure 8:
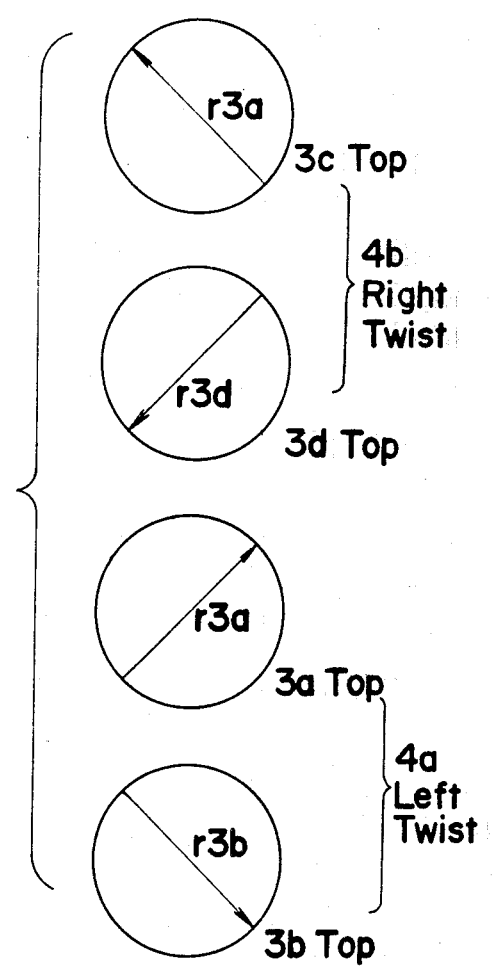

However, it is to be noted that, even in the double-layered twisted nematic liquid crystal display device of field effect type, a sufficient effect can be obtained if the liquid crystal molecule orientation (the direction of twist of the liquid crystal molecules in the double layered structure and the relative orientation of the longitudinal axes of the liquid crystal molecules) is other than that shown in FIG. 3. An example of which is shown in FIG. 6. Referring to FIG. 6, a curve (A) is exhibited in the case where the liquid crystal molecule orientation is such as shown in FIG. 3; a curve (B) is exhibited in the case where the liquid crystal layers 4a and 4b are twisted in respective directions as shown in FIG. 7; and a curve (C) is exhibited in the case where the liquid crystal layers 4a and 4b are twisted in respective directions as shown in FIG. 8 and the direction of the longitudinal axis of the liquid crystal molecule most adjacent the substrate 1a is made to be parallel. As can be seen from FIG. 6, Ts=0 is established substantially at all wavelengths where the liquid crystal molecule orientation is such as shown in FIG. 3, but this relationship cannot be established where the liquid crystal molecule orientation is such as shown in either FIG. 7 or FIG. 8. Accordingly, it is preferred to set the liquid crystal molecule orientation such as shown in FIG. 3.

Figure 9:
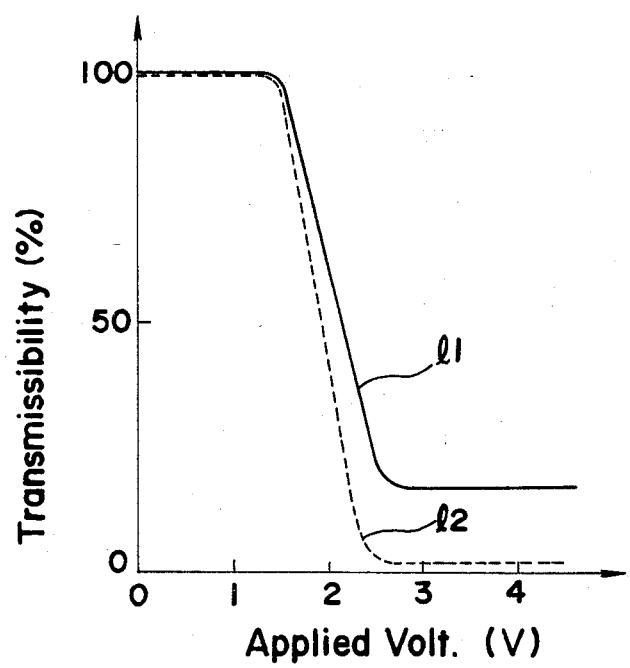
FIG. 9 is a graph showing the relationship between the applied voltage and the light transmissibility obtained when the product of the liquid crystal layer thickness and the birefringence is varied.

In addition, where no electrical voltage is applied between the transparent electrodes 2a and 2b, the interference coloring resulting from the elliptically polarized light can be corrected. However, where a sufficient voltage is applied between the transparent electrodes 2a and 2b, the interference coloring will appear in the liquid crystal layer 4b which act as a compensator. The condition required to minimize the interference coloring relative to the light of maximum visible wavelength of 550 nm is to make the value of d·Δn to be 0.5 μm, 1.0 μm or 1.65 μm. Each of these values in practice has its own tolerance and, accordingly, the value of d·Δn may be selected to be within the range of 0.4 to 0.6 μm, 0.8 to 1.2 μm or 1.5 to 1.8 μm in order to minimize the interference coloring relative to the light of the maximum visible wavelength. FIG. 9 illustrates the graph showing the relation between the applied voltage and the light transmissibility obtained where the value of d·Δn is selected to be 0.7 μm and 0.5 μm. Curves $l_1$ and $l_2$ were given when the value of d·Δn was 0.7 μm and 0.5 μm, respectively. As can be seen from FIG. 9, when the value of d·Δn is set to be 0.5 μm, the display quality can be improved.

As hereinbefore discussed, the double-layered liquid crystal display device integrated with the compensator formed by the liquid crystal layer according to the present invention can be multiplex-addressed to effect a high quality display with no deterioration in characteristic which would otherwise result from the interference coloring. Accordingly, by utilizing the present invention, a high quality display of a relatively large volume of information is possible with the minimized electrical power consumption in computer terminal device, character display devices utilizing telephone cables, small-size television receiver sets and other display systems.

Figure 10:
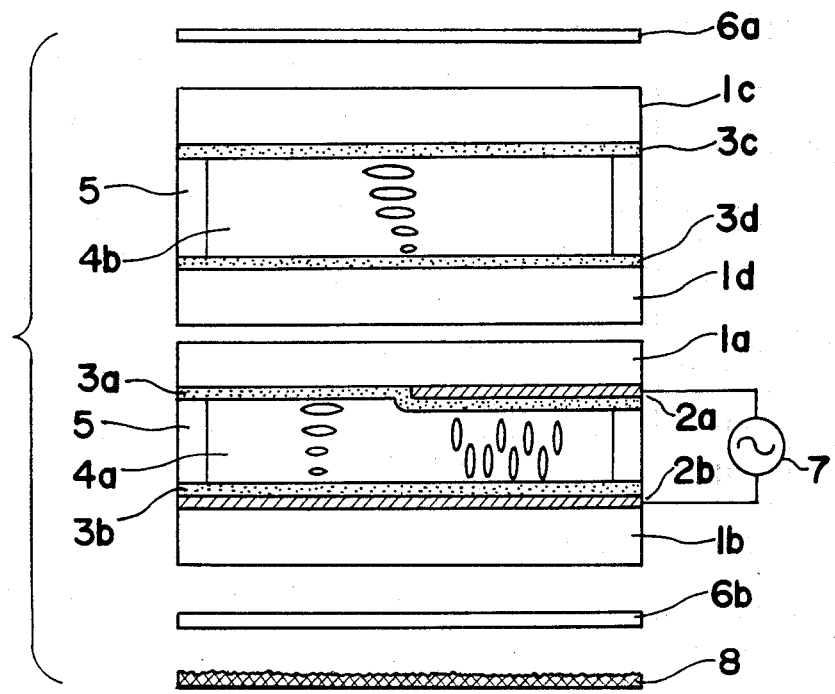
FIG. 10 is a view similar to FIG. 2, showing another preferred embodiment of the present invention.

Although in the foregoing embodiment shown in FIG. 2, it has been described that the number of the transparent substrates employed is three, four transparent substrates 1a, 1b, 1c and 1d may be employed such as shown in FIG. 10 with the liquid crystal layers 4a and 4b positioned respectively between the substrates 1a and 1b and between the substrates 1c and 1d.

Although the present invention has fully been described in connection with the preferred embodiments thereof with reference to the accompanying drawings, it is to be noted that various changes and modifications are apparent to those skilled in the art. Such changes and modifications are, unless they depart from the true scope of the present invention, to be construed as included within such true scope of the present invention.

What is claimed is:

1. A double-layered twisted nematic liquid crystal display device which comprises a double layered structure including first and second layers of liquid crystal, the molecules of said liquid crystal having their longitudinal axes which are twisted, the direction of twist in the first layer being different from that in the second layer and wherein the longitudinal axes of the liquid crystal molecules in the first layer are perpendicular to the liquid crystal molecules of the second layer an electrical power supply means for applying a voltage to one of the first and second layers for controlling the orientation of the molecules of the liquid crystal in the first layer, the other of said first and second layers serving as a compensator which compensates for interference coloring, and a polarizing means for visibly enhancing the orientation of the molecules of the liquid crystal in the first layer when the voltage is applied thereto.

2. A display device as claimed in claim 1, wherein the product d·Δn of the thickness d of the first layer and the birefringence Δn between ordinary light and extraordinary light is substantially equal to the product d·Δn of the thickness d of the second layer and the birefringence Δn between the ordinary light and the extraordinary light.

3. A display device as claimed in claim 2, wherein the absolute value of the product d·Δn is within the range of 0.36 to 2.0 μm.

4. A display device as claimed in claim 2 or 3, wherein said product d·Δn is selected to be within the range of 0.4 to 0.6 μm, 0.8 to 1.2 μm or 1.5 to 1.8 μm.

* * * * *